United States Patent
Lee et al.

(10) Patent No.: US 12,153,514 B2
(45) Date of Patent: Nov. 26, 2024

(54) STORAGE DEVICE, ELECTRONIC DEVICE INCLUDING THE SAME, AND OPERATING METHOD THEREOF

(71) Applicant: SK hynix Inc., Gyeonggi-do (KR)

(72) Inventors: Seon Ju Lee, Gyeonggi-do (KR); Min Hwan Moon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/190,979

(22) Filed: Mar. 28, 2023

(65) Prior Publication Data

US 2024/0126682 A1  Apr. 18, 2024

(30) Foreign Application Priority Data

Oct. 14, 2022 (KR) .......................... 10-2022-0131880

(51) Int. Cl.
*G06F 12/02* (2006.01)
*G06F 11/14* (2006.01)

(52) U.S. Cl.
CPC ........ *G06F 12/023* (2013.01); *G06F 11/1415* (2013.01); *G06F 2201/805* (2013.01); *G06F 2212/251* (2013.01)

(58) Field of Classification Search
CPC ............... G06F 12/023; G06F 11/1415; G06F 2201/805; G06F 2212/251
See application file for complete search history.

(56) References Cited

U.S. PATENT DOCUMENTS

| 12,007,996 B2* | 6/2024 | Rao ......................... H04L 67/10 |
| 2016/0188233 A1* | 6/2016 | Chiao ................... G06F 3/0679 |
| | | 711/103 |
| 2017/0075570 A1* | 3/2017 | Yoon ..................... G06F 3/0679 |

(Continued)

FOREIGN PATENT DOCUMENTS

| KR | 10-2018-0050862 A | 5/2018 |
| KR | 10-2019-0090614 A | 8/2019 |

OTHER PUBLICATIONS

E. H. Nam, B. S. J. Kim, H. Eom and S. L. Min, "Ozone (O3): An Out-of-Order Flash Memory Controller Architecture," in IEEE Transactions on Computers, vol. 60, No. 5, pp. 653-666, May 2011 (Year: 2011).*

(Continued)

*Primary Examiner* — Matthew M Kim
*Assistant Examiner* — Indranil Chowdhury
(74) *Attorney, Agent, or Firm* — IP & T GROUP LLP

(57) ABSTRACT

A storage device may include: a plurality of memory dies; and a memory controller for receiving a first read request from a first function, controlling at least one memory die to perform a read operation according to the first read request, and controlling, when receiving a second read request from a second function in the course of the read operation according to the first read request, the at least one memory die to suspend the read operation according to the first read request and to perform a read operation according to the second read request based on a result obtained by comparing performance requirement information of the second function with residual time information of the second read request, which is determined according to a performance degree of the read operation being performed according to the first read request.

20 Claims, 10 Drawing Sheets

(56) References Cited

U.S. PATENT DOCUMENTS

| | | | | |
|---|---|---|---|---|
| 2019/0079698 A1* | 3/2019 | Lee | ...................... | G06F 3/0673 |
| 2019/0377580 A1* | 12/2019 | Vorbach | .................... | G06F 1/20 |
| 2021/0072922 A1* | 3/2021 | Shin | ...................... | G06F 3/0659 |
| 2023/0384936 A1* | 11/2023 | Jin | ........................ | G06F 3/0679 |
| 2024/0176543 A1* | 5/2024 | Kim | ........................ | G06F 3/061 |

OTHER PUBLICATIONS

G. Lee et al., "Internal Task-Aware Command Scheduling to Improve Read Performance of Embedded Flash Storage Systems," in IEEE Access, vol. 9, pp. 71638-71650, 2021 (Year: 2021).*

\* cited by examiner

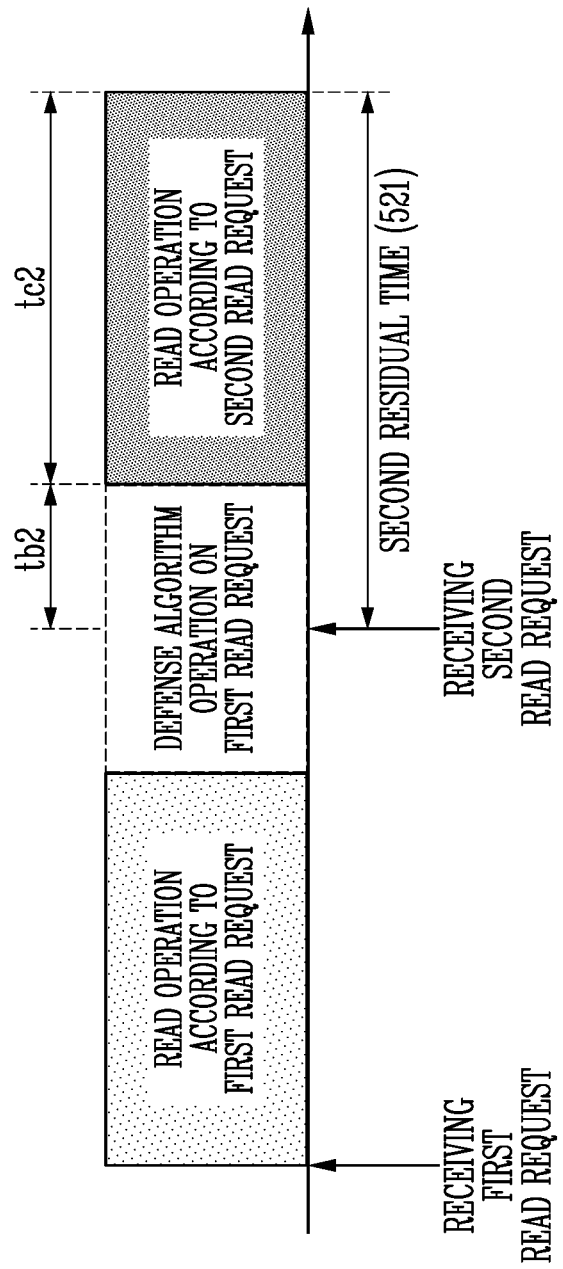

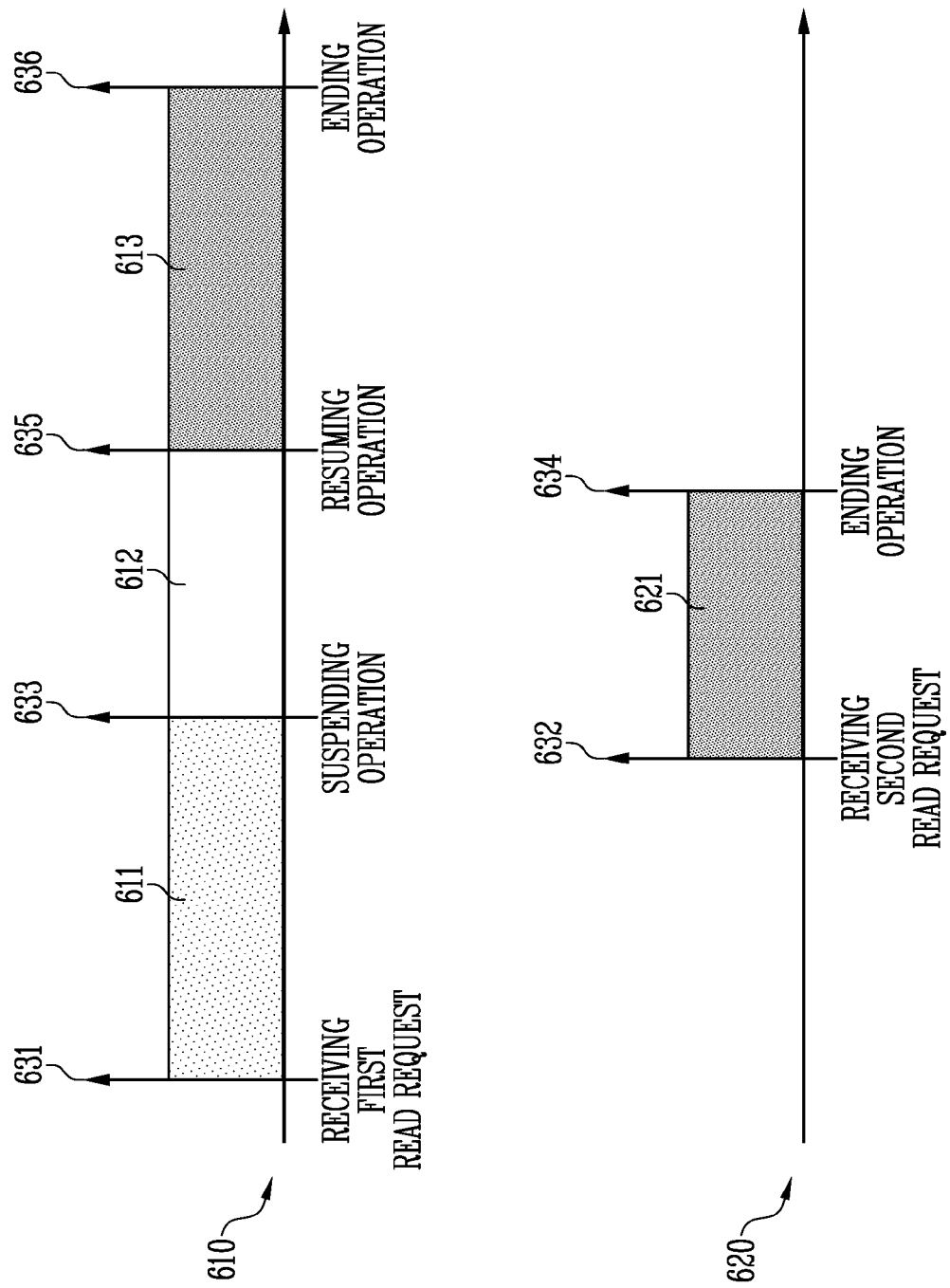

STORAGE DEVICE, ELECTRONIC DEVICE INCLUDING THE SAME, AND OPERATING METHOD THEREOF

CROSS-REFERENCE TO RELATED APPLICATION

The present application claims priority under 35 U.S.C. § 119(a) to Korean patent application number 10-2022-0131880, filed on Oct. 14, 2022, and which is incorporated herein by reference in its entirety.

BACKGROUND

Field of Invention

Various embodiments of the present disclosure generally relate to an electronic device, and more particularly, to a storage device, an electronic device including the same, and an operating method thereof.

Description of Related Art

A storage device is a device which stores data under the control of a host device such as a computer or a smart phone. The storage device may include a memory device for storing data and a memory controller for controlling the memory device. The memory device is classified into a volatile memory device and a nonvolatile memory device.

The volatile memory device is a memory device in which data is stored only when power is supplied, and stored data disappears when the supply of power is interrupted. The volatile memory device may include a Static Random Access Memory (SRAM), a Dynamic Random Access Memory (DRAM), and the like.

The nonvolatile memory device is a memory device in which data does not disappear even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

SUMMARY

Embodiments of the present disclosure provide a storage device for reducing latency according to a read request, an electronic device including the storage device, and an operating method of the electronic device.

In accordance with an aspect of the present disclosure, there is provided a storage device including: a plurality of memory dies configured to receive data and a command indicating a specific operation from the outside; and a memory controller configured to: receive a first read request from a first function, control at least one memory die among the plurality of memory dies to perform a read operation according to the first read request, and control, when receiving a second read request from a second function in the course of the read operation according to the first read request, the at least one memory die to suspend the read operation according to the first read request and to perform a read operation according to the second read request based on a result obtained by comparing performance requirement information of the second function with residual time information of the second read request, which is determined according to a performance degree of the read operation being performed according to the first read request.

In accordance with another aspect of the present disclosure, there is provided an operating a memory controller for controlling a memory device including a plurality of memory dies, the method including: receiving a first read request from a first function; controlling at least one memory die among the plurality of memory dies to perform a read operation according to the first read request; receiving a second read request from a second function before the read operation according to the first read request is completed; controlling the at least one memory die to suspend the read operation according to the first read request, based on a result obtained by comparing performance requirement information of the second function with residual time information of the second read request, which is determined according to a performance degree of the read operation according to the first read request; and controlling the at least one memory die to perform a read operation according to the second read request.

In accordance with still another aspect of the present disclosure, there is provided a memory controller including: a performance requirement information storage configured to store performance requirement information of each of a plurality of functions; a scheduler configured to receive a first read request from a first function among the plurality of functions; and a memory control unit configured to control at least one memory die of a memory device to perform a read operation according to the first read request, wherein the scheduler is configured to control, when a second read request is received from a second function among the plurality of functions before the read operation according to the first read request is completed, the at least one memory die to suspend the read operation according to the first read request and to perform a read operation according to a second read request, based on a result obtained by comparing the performance requirement information of the second function with residual time information of the second read request, which is determined according to a performance degree of the read operation according to the first read request.

In accordance with still another aspect of the present disclosure, there is provided an operating method of a controller, the operating method including: controlling, in response to a first request for a first operation, a memory device to perform the first operation, controlling, in response to a second request for a second operation, the memory device to hold the first operation to perform the second operation when a sum of first and second time amounts is greater than a latency of the second operation, wherein the first time amount is a remaining amount required to complete the first operation, and wherein the second time amount is an expected amount required to complete the second operation.

BRIEF DESCRIPTION OF THE DRAWINGS

Various embodiments of the present disclosure will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 5B is a diagram for describing a second residual time of the second read request in accordance with an embodiment of the present disclosure.

FIG. 6 is a diagram for describing an operation in which a read operation according to a first read request is suspended and the second read request is processed, in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
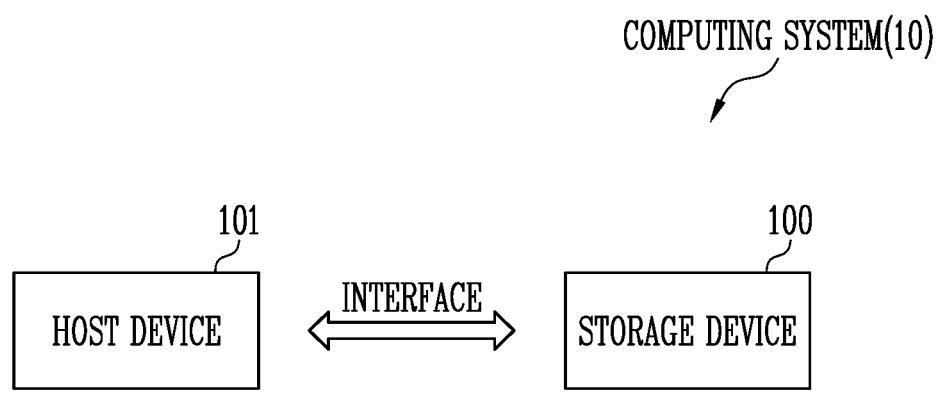
FIG. 1 is a diagram illustrating a computing system in accordance with an embodiment of the present disclosure.

FIG. 1 is a diagram illustrating a computing system 10 in accordance with an embodiment of the present disclosure.

Referring to FIG. 1, the computing system 10 may include a storage device 100 and a host device 101. The storage device 100 and the host device 101 may perform wired/wireless communication through various interfaces.

The host device 101 may communicate with the storage device 100, using at least one of various communication standards or interfaces, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

In this specification, for convenience of description, it is described that the storage device 100 and the host device 101 perform data communication according to a UFS communication interface. However, embodiments of the present disclosure are not limited to that the data communication is performed according to the UFS communication interface. Specifically, the storage device 100 and the host device 101 may perform data communication by using a command defined as a Protocol Information Unit (hereinafter, referred to as PIU). The PIU may be a type of data packet generated according to a predetermined protocol.

The PIU may be a command with which the host device 101 or the storage device 100 requests, instructs or responds to performance of an operation. In an embodiment, various PIUs may be defined according to uses and purposes. For example, the PIU may be any one of a query request PIU, a command PIU, a response PIU, a data out PIU, a data in PIU, and a ready to transfer PIU.

In an embodiment, the query request PIU may include a device descriptor for providing several parameters. The device descriptor may include information representing whether the storage device 100 is a storage device which supports an advance replay protection memory block (RPMB) mode.

The smallest size of the PIU may be 32 bytes, and the largest size of the PIU may be 65,600 bytes. The format of the PIU may have different sizes according to types thereof. A hardware configuration of the host device 101 will be described in FIG. 2.

The storage device 100 may be a device for storing data under the control of the host device 101, such as a mobile phone, a smart phone, an MP3 player, a laptop computer, a desktop computer, a game console, a TV, a tablet PC or an in-vehicle infotainment system. Also, the storage device 100 may be a device for storing data under the control of the host device 101 for storing high-capacity data in one place, such as a server or a data center.

The storage device 100 may be manufactured as any of various types of storage devices according to a host interface that is a communication scheme with the host device 101. For example, the storage device 100 may be configured with any of a variety of types of memory modules, such as a Solid State Drive (SSD), a multimedia card in the form of an MMC, an eMMC, an RS-MMC and a micro-MMC, a secure digital card in the form of an SD, a mini-SD and a micro-SD, a Universal Serial Bus (USB) memory module, a Universal Flash Storage (UFS) device, a personal computer memory card international association (PCMCIA) card type memory module, a peripheral component interconnection (PCI) card type memory module, a PCI express (PCI-E) card type memory module, a Compact Flash (CF) card, a Smart Media Card (SMC), and a memory stick.

The storage device 100 may be manufactured as any of various package types. For example, the storage device 100 may be manufactured as any of various package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP). A hardware configuration of the storage device 100 will be described in FIG. 2.

Figure 2:
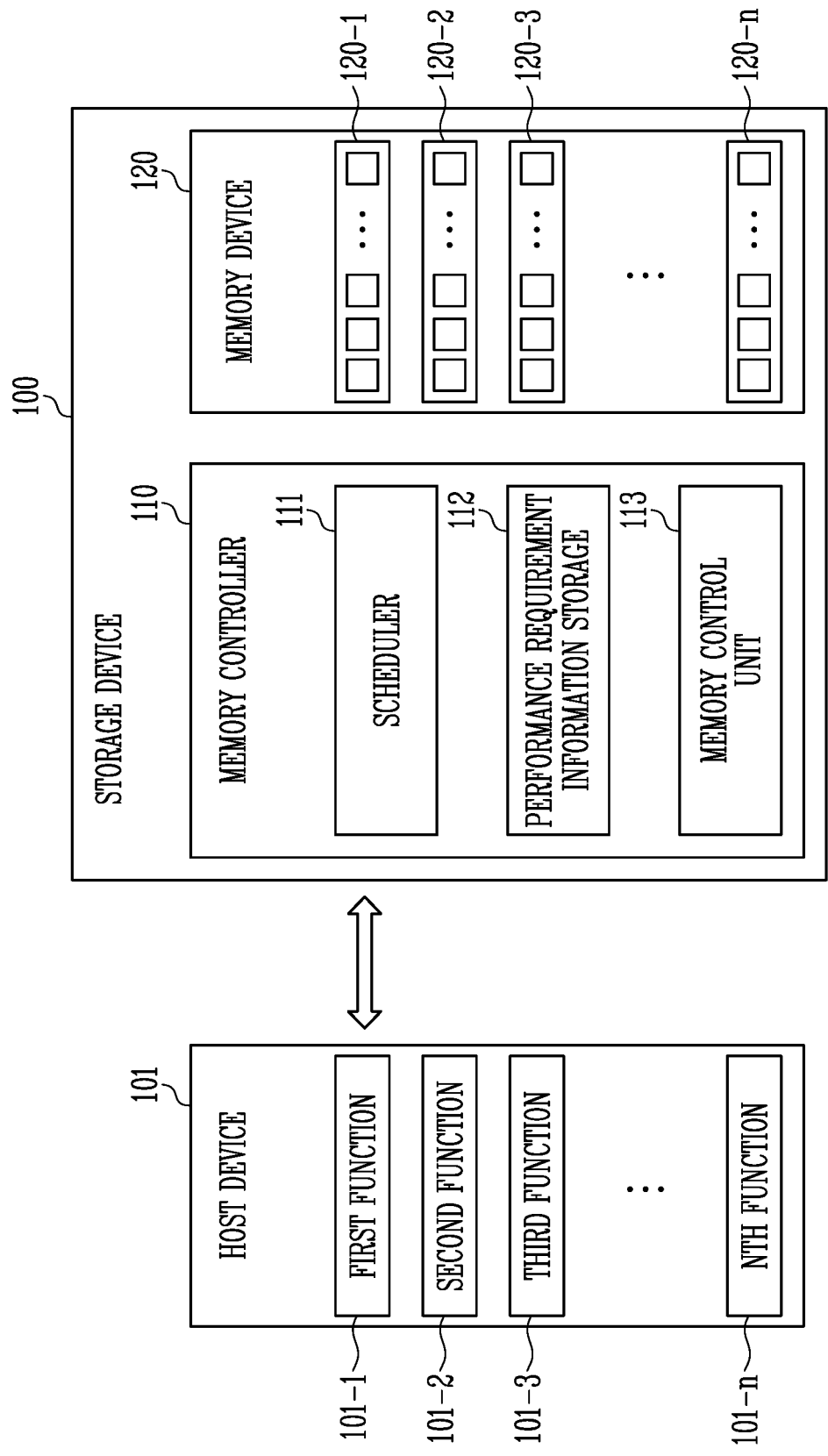
FIG. 2 is a detailed diagram of a host device and a storage device, which are shown in FIG. 1 in accordance with an embodiment of the present disclosure.

FIG. 2 is a detailed diagram of the host device 101 and the storage device 100, which are shown in FIG. 1 in accordance with an embodiment of the present disclosure.

Referring to FIG. 2, the host device 101 and the storage device 100 may include various hardware components.

The host device 101 may include a plurality of functions (i.e., a first function 101-1, a second function 101-2, a third function 101-3, . . . , and an nth function 101-n). The plurality of functions may be recognized as a plurality of host devices 101 logically sorted by the storage device 100. In an example, the storage device 100 may identify the first function 101-1 and the second function 101-2 as a plurality of host devices 101 which are logically sorted. The "function" may be expressed as a "physical function" or "skill."

The storage device 100 may include a memory controller 110 and a memory device 120. The memory controller 110 may include a scheduler 111, a performance requirement information storage 112, and a memory control unit 113. In an embodiment, the scheduler 111 and the memory control unit 113 may correspond to a control logic which performs different functions in one chip. That is, the scheduler 111 and the memory control unit 113 may be configured as one integrated circuit.

The memory controller 110 may control overall operations of the storage device 100.

When power is applied to the storage device 100, the memory controller 110 may execute firmware (FW). When the memory device 120 is a flash memory device, the memory controller 110 may execute FW such as a Flash Translation Layer (FTL) for controlling communication between the host device 101 and the memory device 120.

In an embodiment, the memory controller 110 may receive data and a Logical Block Address (LBA) from the host device 101, and translate the LBA into a Physical Block Address (PBA) representing addresses of memory cells included in the memory device 120, in which data is to be stored.

The scheduler 111 may maintain or change an operation order of a read request received from the plurality of functions 101-1 to 101-$n$ included in the host device 101. In an example, when the scheduler 111 receives a plurality of read requests from the plurality of functions 101-1 to 101-$n$, the scheduler 111 may provide the memory control unit 113 with a request for suspension and performance of the read requests by using performance requirement information stored in the performance requirement information storage 112 and residual time information received from the memory control unit 113. In the present disclosure, the performance requirement information may be a latency. A detailed operation of the scheduler 111 will be described in FIG. 3.

The performance requirement information storage 112 may store performance requirement information of each of the plurality of functions 101-1 to 101-$n$ included in the host device 101. Performance requirement information may be different from each other with respect to the plurality of functions 101-1 to 101-$n$ included in the host device 101. That is, the performance requirement information of the plurality of functions 101-1 to 101-$n$ may have values different from each other.

The memory control unit 113 may control the memory device 120 to perform a program operation, a read operation, an erase operation, or the like in response to a request from the host device 101. In the program operation, the memory control unit 113 may provide a program command, a PBA, and data to the memory device 120. In the read operation, the memory control unit 113 may provide a read command and a PBA to the memory device 120. In the erase operation, the memory control unit 113 may provide an erase command and a PBA to the memory device 120.

In an embodiment, the memory control unit 113 may autonomously generate a command, an address, and data regardless of any request from the host device 101, and transmit the command, the address, and the data to the memory device 120. For example, the memory control unit 113 may provide the memory device 120 with a command, an address, and data, which are used to perform read and program operations accompanied in performing wear leveling, read reclaim, garbage collection, or the like.

In an embodiment, the memory control unit 113 may control at least two memory devices 120. The memory control unit 113 may control the memory devices 120 according to an interleaving scheme so as to improve operational performance. The interleaving scheme may be a scheme for controlling operations on at least two memory devices 120 to overlap with each other.

The memory device 120 may include a memory cell array (not shown) including a plurality of memory cells for storing data.

Each of the memory cells may be configured as any of a Single Level Cell (SLC) capable of storing one data bit, a Multi-Level Cell (MLC) capable of storing two data bits, a Triple Level Cell (TLC) capable of storing three data bits, and a Quadruple Level Cell (QLC) capable of storing four data bits.

The memory cell array (not shown) may include a plurality of memory blocks. Each memory block may include a plurality of memory cells. Each memory block may include a plurality of pages. In an embodiment, the page may be a unit for storing data in the memory device 120 or reading data stored in the memory device 120. The memory block may be a unit for erasing data.

In an embodiment, the memory device 120 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (SU-RAM), or the like. In this specification, for convenience of description, a case where the memory device 120 is a NAND flash memory is described.

The memory device 120 may receive a command and an address from the memory controller 110, and access an area selected by the address in the memory cell array. The memory device 120 may perform an operation indicated by the command on the area selected by the address.

For example, the memory device 120 may perform a write operation (program operation), a read operation, and an erase operation. In the program operation, the memory device 120 may program data in the area selected by the address. In the read operation, the memory device 120 may read data from the area selected by the address. In the erase operation, the memory device 120 may erase data stored in the area selected by the address.

The memory device 120 may include a plurality of memory dies (i.e., a first memory die 120-1, a second memory die 120-2, a third memory die 120-3, . . . , and an nth memory die 120-$n$. Each of the memory dies may include a plurality of memory blocks. In an example, each of the plurality of functions 101-1 to 101-$n$ may respectively provide read request for different memory dies. In another example, the plurality of functions 101-1 to 101-$n$ may provide a read request for one memory die among the plurality of memory dies 120-1 to 120-$n$.

Figure 3:
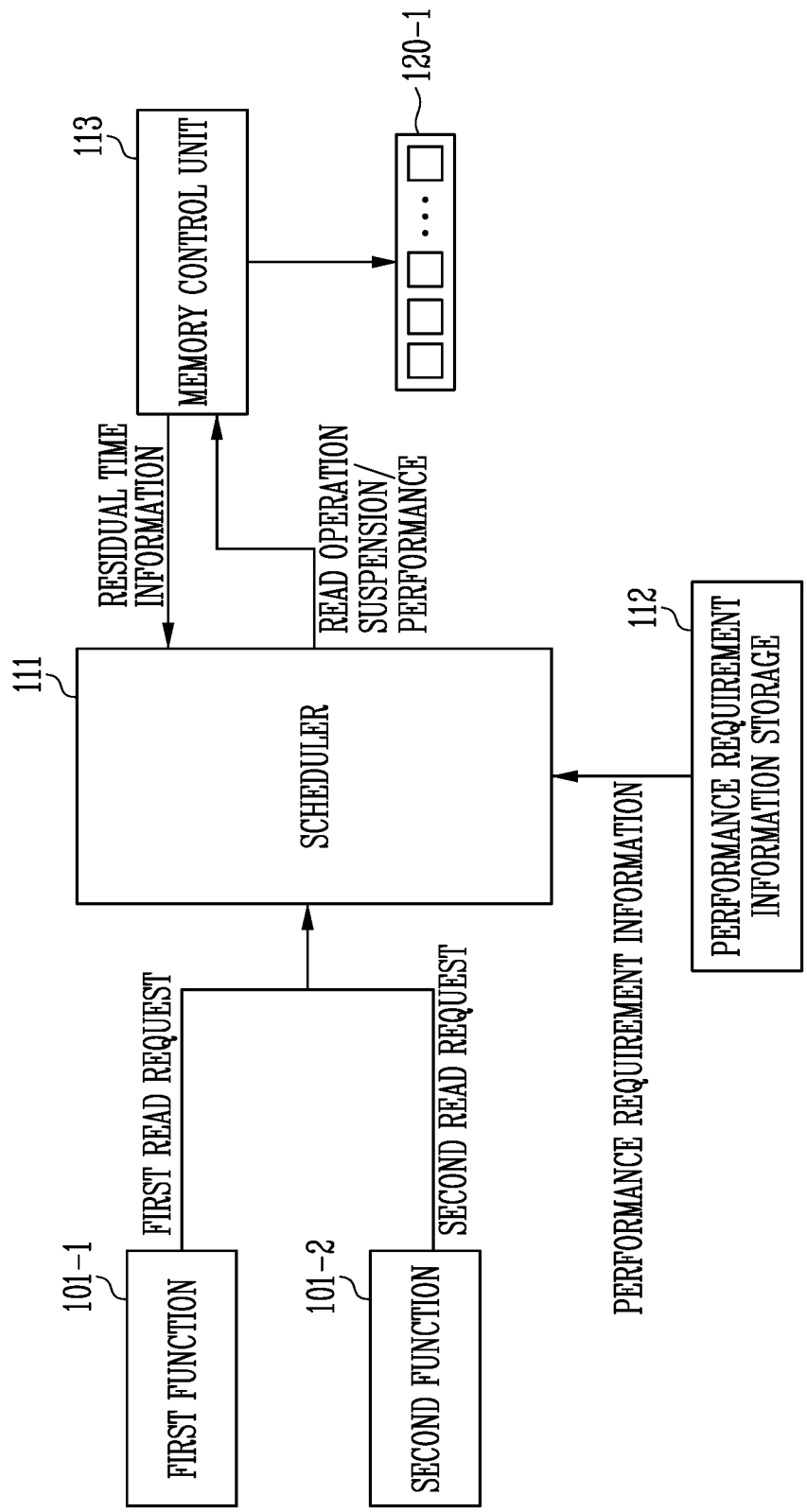
FIG. 3 is a diagram for describing a sequence in which the storage device processes a read request received from the host device in accordance with an embodiment of the present disclosure.

FIG. 3 is a diagram for describing a sequence in which the storage device 100 processes a read request received from the host device 101 in accordance with an embodiment of the present disclosure.

Referring to FIG. 3, the scheduler 111 may determine which request selected from a first read request received from the first function 101-1 and a second read request received from the second function 101-2 is to be first processed, based on a result obtained by comparing residual time information and performance requirement information with each other.

The scheduler 111 may receive the first read request from the first function 101-1 and receive the second read request from the second function 101-2. The first function 101-1 and the second function 101-2 may be host devices 101 logically sorted from the host device 101 shown with reference to FIG. 1 with respect to the storage device 100.

The scheduler 111 may process the first read request received from the first function 101-1 and the second read request received from the second function 101-2 according to an order in which the scheduler 111 receives the first read request and the second read request. That is, the scheduler 111 may first process a first received read request selected from the first read request and the second read request.

The scheduler 111 may acquire performance requirement information from the performance requirement information storage 112. Performance requirement information of the first function 101-1 and performance requirement information of the second function 101-2 may be stored in the performance requirement information storage 112. The performance requirement information of the first function 101-1 and the performance requirement information of the second function 101-2 may be pre-specified values according to a request of the first function 101-1. Therefore, the performance requirement information of the first function 101-1 and the performance requirement information of the second function 101-2 may be constant values while the first read request or the second read request is processed.

The scheduler 111 may acquire residual time information from the memory control unit 113. The residual time information may be information on a residual time taken until the second read request which the scheduler 111 receives from the second function 101-2 is processed. In an example, the residual time taken until the second read request is processed may be changed according to a time at which the scheduler 111 receives the second read request from the second function 101-2.

The scheduler 111 may provide the memory control unit 113 with a request instructing the memory control unit 113 to suspend the read operation according to the first read request and to perform a read operation according to the second read request, based on a result obtained by comparing the performance requirement information of the second function 101-2, which is acquired from the performance requirement information storage 112, with the residual time information of the second read request, which is acquired from the memory control unit 113. In an example, when a residual time of the second read request is greater than a time required to satisfy performance of the second function 101-2, based on the result obtained by comparing the performance requirement information of the second function 101-2 and the residual time information of the second read request with each other, the scheduler 111 may provide the memory control unit 113 with a request instructing the memory control unit 113 to suspend the read operation according to the first read request and to perform the read operation according to the second read request. In another example, when the residual time of the second read request is less than the time required to satisfy the performance of the second function 101-2, based on the result obtained by comparing the performance requirement information of the second function 101-2 and the residual time information of the second read request with each other, the scheduler 111 may not provide the memory control unit 113 with a request instructing the memory control unit 113 to perform the second read request until the processing according to the first read request is completed. That is, when the residual time of the second read request is less than the time required to satisfy the performance of the second function 101-2, based on the result obtained by comparing the performance requirement information of the second function 101-2 and the residual time information of the second read request with each other, the memory control unit 113 does not receive any additional request. Therefore, the memory control unit 113 does not suspend the read operation according to the first read request but may continuously perform a read operation according to the first read request.

The memory control unit 113 may control at least one memory die (e.g., the first memory die 120-1) included in the memory device 120 to suspend the read operation according to the first read request and to perform the read operation according to the second read request, based on that the memory control unit 113 receives, from the scheduler 111, the request instructing the memory control unit 113 to suspend the read operation according to the first read request and to perform the read operation according to the second read request. In another example, the memory control unit 113 may control at least one memory die (e.g., the first memory die 120-1) included in the memory device 120 to process the first read request, based on that the memory control unit 113 does not receive, from the scheduler 111, the request instructing the memory control unit 113 to suspend the read operation according to the first read request and to perform the read operation according to the second read request.

Figure 4:
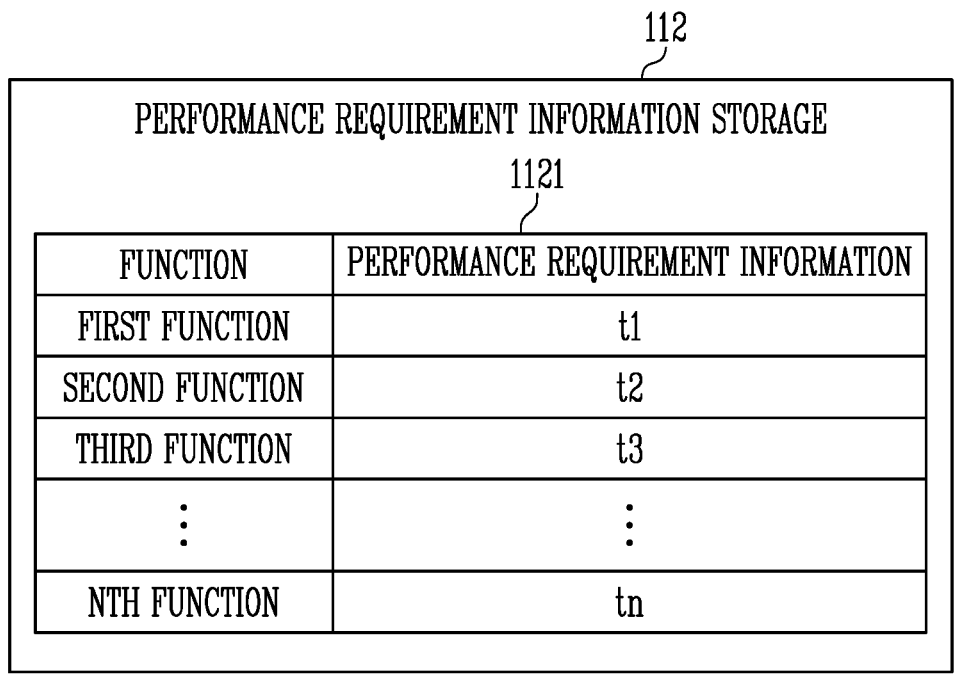
FIG. 4 is a diagram illustrating a performance requirement information table stored in a performance requirement information storage in accordance with an embodiment of the present disclosure.

FIG. 4 is a diagram illustrating a performance requirement information table 1121 stored in the performance requirement information storage 112 in accordance with an embodiment of the present disclosure.

Referring to FIG. 4, the performance requirement information storage 112 may store a table for performance requirement information on the plurality of functions 101-1 to 101-n shown with reference to FIG. 2.

The performance requirement information storage 112 may store a table for performance requirement information of a plurality of functions (i.e., a first function, a second function, a third function, . . . , and an nth function). In an example, performance requirement information of the first function may have a value of t1, and performance requirement information of the second function may have a value of t2.

In an embodiment, t1 as the value which the performance requirement information of the first function has and t2 as the value which the performance requirement information of the second function has may be values different from each other. In an example, t1 as the value which the performance requirement information of the first function 101-1, shown with reference to FIGS. 2 and 3, may be greater than t2 as the value which the performance requirement information of the second function 101-2, shown with reference to FIGS. 2 and 3. For example, t1 may be 1 ms and t2 may be 300 μs.

Figure 5A:
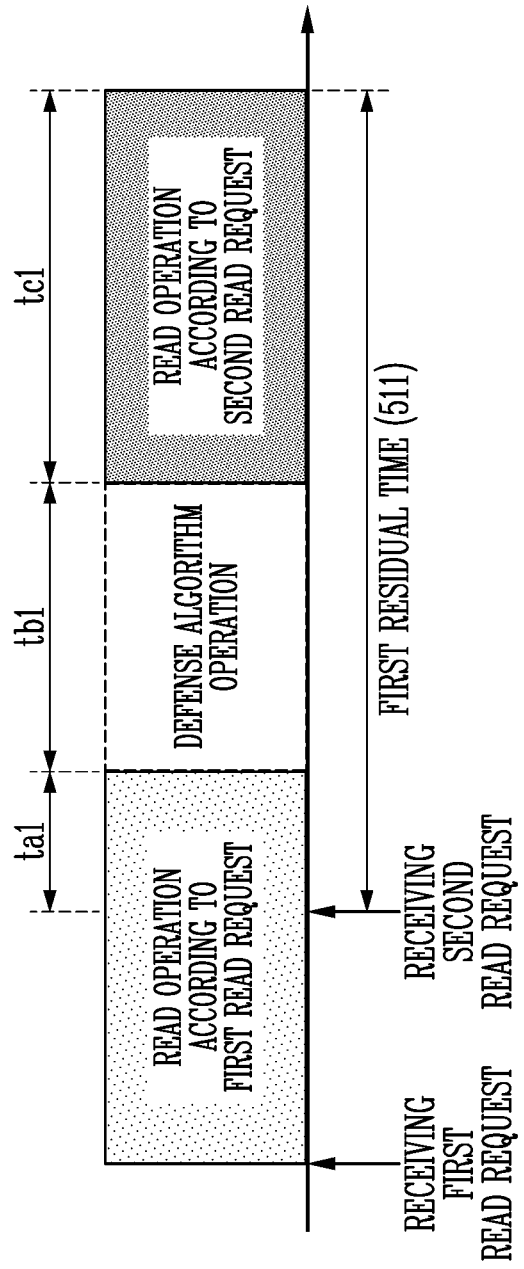
FIG. 5A is a diagram for describing a first residual time of a second read request in accordance with an embodiment of the present disclosure.
Figure 5C:
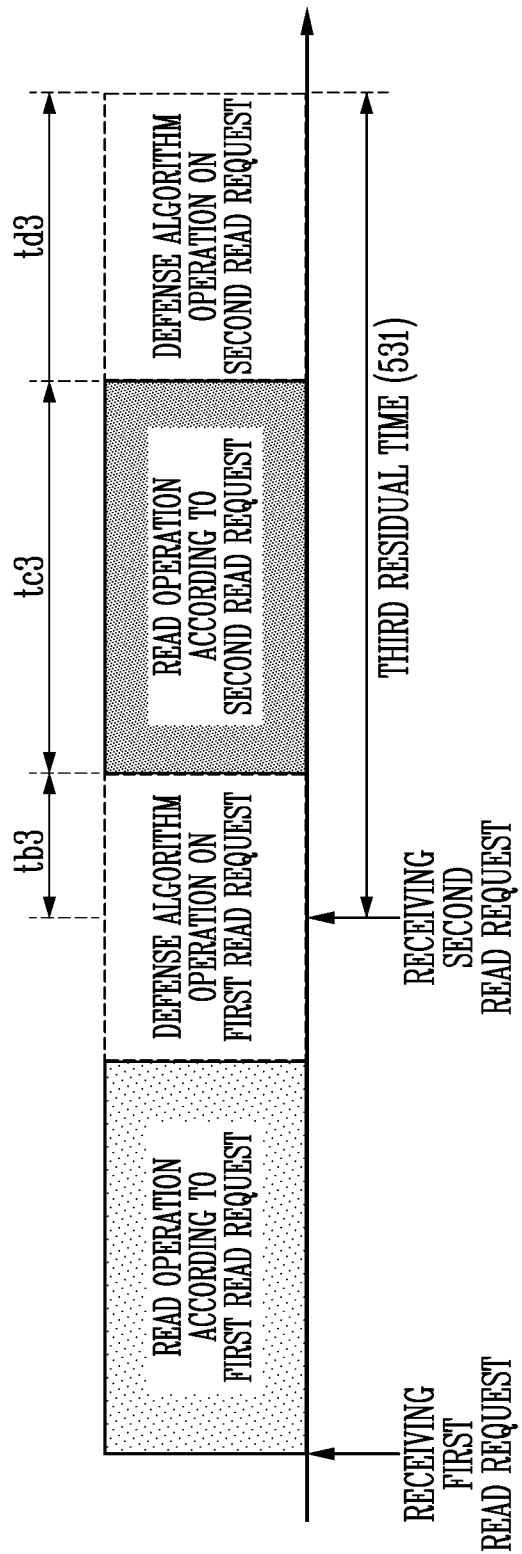
FIG. 5C is a diagram for describing a third residual time of the second read request in accordance with an embodiment of the present disclosure.

FIG. 5A is a diagram for describing a first residual time 511 of the second read request in accordance with an embodiment of the present disclosure. FIG. 5B is a diagram for describing a second residual time 521 of the second read request in accordance with an embodiment of the present disclosure. FIG. 5C is a diagram for describing a third residual time 531 of the second read request in accordance with an embodiment of the present disclosure.

Referring to FIGS. 5A, 5B, and 5C, the residual time of the second read request may be changed according to a time at which the scheduler 111 receives the second read request from the second function 101-2 in a state in which the read operation according to the first read request which the scheduler 111 receives from the first function 101-1 shown with reference to FIG. 3 is being performed. That is, in an example, the residual time information of the second read request may be determined according to a performance degree of the first read request.

In accordance with an embodiment shown in FIG. 5A, when the scheduler 111 shown with reference to FIG. 3 receives the second read request while the read operation according to the first read request is performed after the scheduler 111 receives the first read request, the first residual time 511 as the residual time of the second read request may be equal to a sum of a residual processing time ta1 of the read operation according to the first read request and a processing time tc1 of the read operation according to the second read request. In another embodiment, when a defense algorithm operation on the first read request is performed as the read operation according to the first read request fails, the first residual time 511 may be equal to a sum of a residual processing time ta1 of the read operation according to the first read request, a processing time tb1 of the defense algorithm operation on the first read request and the processing time tc1 of the read operation according to the second read request. The defense algorithm operation may include all operations performed by the memory controller 110 when a read operation fails. For example, the defense algorithm operation may be a read retry operation, a soft decoding operation, or an e-boost operation. The read retry operation may be performed by using a read retry table (RRT). The soft decoding operation may be performed by using an error correction code. The e-boost operation may be an optimum read level search operation. In this disclosure, a read operation may include a defense algorithm operation and a processing time of read operation may include a processing time of defense algorithm operation unless otherwise specified for clear understanding of the present invention.

In accordance with the embodiment shown in FIG. 5B, when the scheduler 111 shown with reference to FIG. 3 receives the second read request while a defense algorithm operation on the first read request is performed as the read operation according to the first read request fails after the scheduler 111 receives the first read request, the second residual time 521 as the residual time of the second read request may be equal to a sum of a residual processing time tb2 of the defense algorithm operation on the first read request and a processing time tc2 of the read operation according to the second read request.

In accordance with the embodiment shown in FIG. 5C, when the defense algorithm operation on the second read request is performed as the read operation according to the second read request received by the scheduler 111 shown with reference to FIG. 3 fails while the defense algorithm operation on the first read operation is performed as the read operation according to the first read request fails after the scheduler 111 receives the first read request, the third residual time 531 as the residual time of the second read request may be equal to a sum of a residual processing time tb3 of the defense algorithm operation on the first read request, a processing time tc3 of the read operation according to the second read request, and a processing time td3 of the defense algorithm operation on the second read request.

FIG. 6 is a diagram for describing an operation in which the read operation according to the first read request is suspended and the second read request is processed in accordance with an embodiment of the present disclosure.

Referring to FIG. 6, the second read request may be processed when the read operation according to the first read request is suspended, and the read operation according to the first read request may be resumed when the read operation according to the second read request is completed. A first graph 610 illustrates a read operation order according to the first read request, and a second graph 620 illustrates a read operation order according to the second read request.

When the scheduler 111 shown with reference to FIG. 3 receives the first read request from the first function 101-1 at a first time 631, the memory control unit 113 may control the memory device 120 to perform the read operation according to the first read request in a first section 611. In an example, the memory control unit 113 may control the memory device 120 to perform the read operation according to the first read request simultaneously at the first time 631. In another example, the memory control unit 113 may control the memory device 120 to perform the read operation according to the first read request at a time at which a certain time elapses from the first time 631.

The scheduler 111 may receive the second read request from the second function 101-2 shown with reference to FIG. 3 at a second time 632. The scheduler 111 receiving the second read request from the second function 101-2 at the second time 632 may provide the memory control unit 113 with a request instructing the memory control unit 113 to perform the read operation according to the second read request in at least a portion of a fourth section 621. In an example, the scheduler 111 receiving the second read request at the second time 632 may provide the memory control unit 113 with a request instructing the memory control unit 113 to perform the read operation according to the second read request after the scheduler 111 suspends the read operation according to the first read request at a third time 633. In another example, the scheduler 111 receiving the second read request at the second time 632 may provide the memory control unit 113 with a request instructing the memory control unit 113 to suspend the read operation according to the first read request at the third time 633 and simultaneously, to perform the read operation according to the second read request.

The scheduler 111 may provide the memory control unit 113 with a request instructing the memory control unit 113 to suspend the read operation according to the first read request, based on a result obtained by comparing the performance requirement information of the second function 101-2 shown with reference to FIG. 3 with the residual time information of the second read request. The memory control unit 113 receiving the request instructing the memory control unit 113 to suspend the read operation according to the first read request from the scheduler 111 at the second time 632 may control the memory device 120 such that at least one memory die (e.g., the first memory die 120-1 shown in FIG. 3) performing the read operation according to the first read request suspends the read operation. Accordingly, the read operation according to the first read request may not be performed in a second section 612.

The read operation according to the second read request may be ended at a fourth time 634. In an example, according to of the read operation according to the second read request at the fourth time 634, the memory control unit 113 may acquire data from at least one memory die corresponding to the second read request, and provide the acquired data to the second function 101-2.

At a fifth time 635, the suspended read operation according to the first read request may be resumed. In an example, at the fifth time 635, the scheduler 111 may provide the memory control unit 113 with a request instructing the memory control unit 113 to resume the read operation according to the first read request. The memory control unit 113 receiving the request instructing the memory control unit 113 to resume the read operation according to the first read request from the scheduler 111 at the fifth time 635 may control the memory device 120 to resume or perform the read operation according to the first read request in a third section 613.

At a sixth time 636, the read operation according to the first read request may be ended. In an example, according to of the read operation according to the first read request at the sixth time 636, the memory control unit 113 may acquire data from at least one memory die corresponding to the first read request, and provide the acquired data to the first function 101-1.

Figure 7:
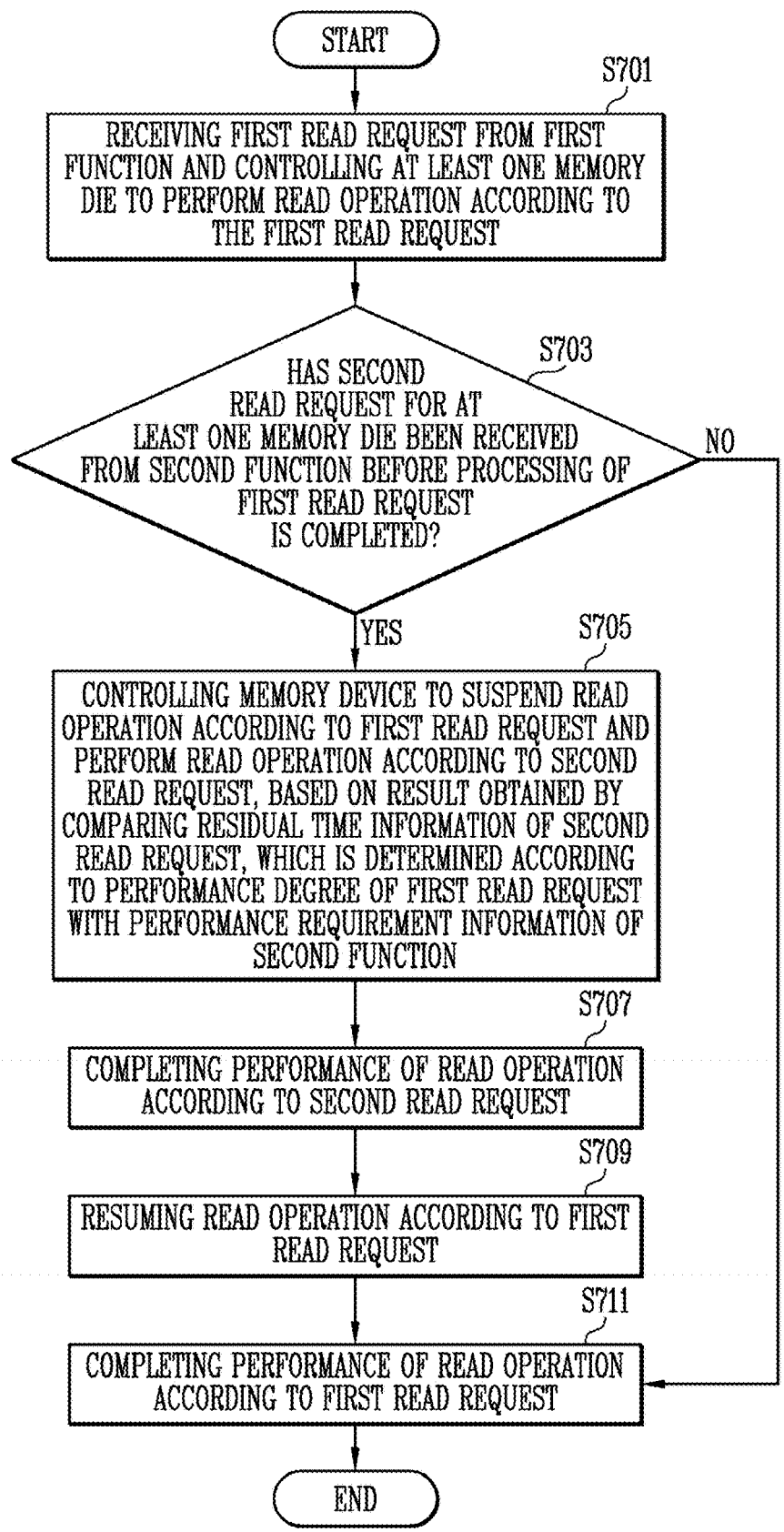
FIG. 7 is a flowchart for describing an operation of the storage device in accordance with an embodiment of the present disclosure.

FIG. 7 is a flowchart for describing an operation of the storage device 100 in accordance with an embodiment of the present disclosure.

Referring to FIG. 7, the storage device 100 may preferentially process one of a first read request and a second read request, based on a result obtained by comparing performance requirement information and residual time information with each other. Hardware components described in FIG. 7 may correspond to the hardware components described in FIG. 3.

In operation S701, the memory controller 110 may receive a first read request from the first function 101-1, and control at least one memory die to perform a read operation according to the first read request. In an example, the scheduler 111 included in the memory controller 110 may receive the first read request from the first function 101-1 and provide the memory control unit 113 with a request instructing the memory control unit 113 to perform the read operation according to the first read request. The memory control unit 113 receiving, from the scheduler 111, the request instructing the memory control unit 113 to perform the read operation according to the first read request may control at least one memory die (e.g., the first memory die 120-1 shown in FIG. 3) included in the memory device 120 to perform the read operation according to the first read request.

In operation S703, the memory controller 110 may determine whether a second read request for at least one memory die has been received from the second function 101-2 before the read operation according to the first read request is completed. In an example, the scheduler 111 included in the memory controller 110 may determine whether the second read request for at least one memory die (e.g., the first memory die 120-1 shown in FIG. 3) has been received from the second function 101-2 before the read operation according to the first read request is completed. In an example, when it is determined that the second read request has been received before the read operation according to the read operation according to the first read request is completed, the scheduler 111 may perform operation S705. In another example, when it is determined that the second read request has not been received before the read operation according to the first read request is completed, the scheduler 111 does not suspend the read operation according to the first read request but may continuously perform the read operation according to the first read request. The memory controller 110 may perform operation S711.

In the operation S705, when the operation 703 is satisfied, the memory controller 110 may control the memory device 120 to suspend the read operation according to the first read request and to perform a read operation according to the second read request, based on a result obtained by comparing residual time information of the second read request determined according to a performance degree of the read request and performance requirement information of the second function.

In an example, the scheduler 111 included in the memory controller 110 may control the at least one memory die (e.g., the first memory die 120-1) included in the memory device 120 to suspend the read operation according to the first read request and to perform the read operation according to the second read request, based on a result obtained by comparing the residual time information of the second read request, which is acquired from the memory control unit 113, with performance requirement information of the second function, which is acquired from the performance requirement information storage 112. For example, when a time taken until performance of the second read request is completed is longer than a time for which the second read request is to be processed such that performance of the second function is maintained, the scheduler 111 may control the at least one memory die (e.g., the first memory die 120-1 shown in FIG. 3) to suspend the read operation according to the first read request and to perform the read operation according to the second read request.

In operation S707, the memory controller 110 may complete the performance of the read operation according to the second read request.

In operation S709, the memory controller 110 may resume the read operation according to the first read request.

In the operation S711, the memory controller 110 may complete the performance of the read operation according to the first read request.

Figure 8:
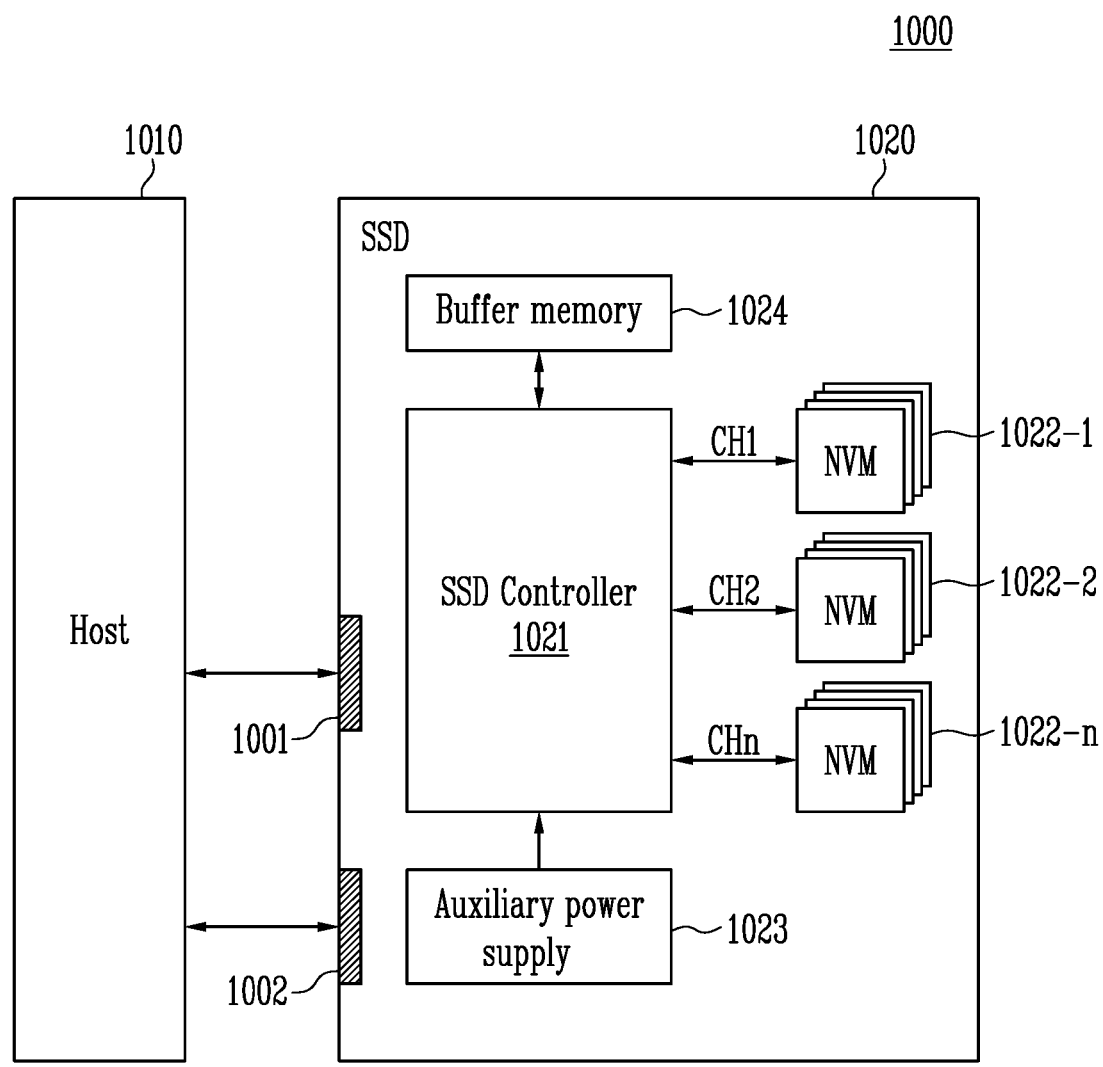
FIG. 8 is a block diagram illustrating a Solid State Drive (SSD) system to which a storage device in accordance with an embodiment of the present disclosure is applied.

FIG. 8 is a block diagram illustrating a Solid State Drive (SSD) system to which a storage device in accordance with an embodiment of the present disclosure is applied.

Referring to FIG. 8, the SSD system 1000 includes a host 1010 and an SSD 1020. The SSD 1020 exchanges a signal with the host 1010 through a signal connector 1001, and receives power through a power connector 1002. The SSD 1020 includes an SSD controller 1021, a plurality of flash memories 1022-1 to 1022-n, an auxiliary power supply 1023, and a buffer memory 1024.

In an embodiment, the SSD controller 1021 may serve as the memory controller 110 described with reference to FIG. 2.

The SSD controller 1021 may control the plurality of flash memories 1022-1 to 1022-n in response to a signal received from the host 1010.

The auxiliary power supply 1023 is connected to the host 1010 through the power connector 1002. The auxiliary power supply 1023 may receive the power PWR input from the host 1010, and charge the power PWR. When the supply of power from the host 1010 is not smooth, the auxiliary power supply 1023 may provide power to the SSD 1020. The auxiliary power supply 1023 may be located in the SSD 1020, or be located at the outside of the SSD 1020. For example, the auxiliary power supply 1023 may be located on a main board, and provide auxiliary power to the SSD 1020.

The buffer memory 1024 operates as a prefetch data storage of the SSD 1020. For example, the buffer memory 1024 may temporarily store data received from the host 1010 or data received from the plurality of flash memories 1022-1 to 1022-n, or temporarily store metadata (e.g., a mapping table) of the flash memories 1022-1 to 1022-n. The buffer memory 1024 may include volatile memories such as a DRAM, an SDRAM, a DDR SDRAM, an LPDDR SDRAM, and a GRAM or nonvolatile memories such as a FRAM, a ReRAM, an STT-M RAM, and a PRAM.

In accordance with the present disclosure, there is provided a storage device for reducing latency according to a read request, an electronic device including the storage device, and an operating method of the electronic device.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

The embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A storage device comprising:
   a plurality of memory dies configured to receive data and a command indicating a specific operation from outside; and
   a memory controller configured to:
   receive a first read request from a first function,
   control at least one memory die among the plurality of memory dies to perform a read operation according to the first read request, and
   control, when receiving a second read request from a second function in course of the read operation according to the first read request, the at least one memory die to suspend the read operation according to the first read request and to perform a read operation according to the second read request based on a result obtained by comparing performance requirement information of the second function with residual time information of the second read request, which is determined according to a performance degree of the read operation being performed according to the first read request.

2. The storage device of claim 1, wherein the memory controller includes:
   a performance requirement information storage configured to store performance requirement information of the first function and the performance requirement information of the second function;
   a scheduler configured to:
   compare the residual time information of the second read request with the performance requirement information of the second function, which is acquired from the performance requirement information storage, and
   generate, based on the comparison result, a signal instructing the at least one memory die to suspend the read operation according to the first read request and to perform the read operation according to the second read request; and
   a memory control unit configured to receive the signal generated by the scheduler and control the at least one memory die to suspend the read operation according to the first read request and process the second read request.

3. The storage device of claim 2, wherein the scheduler is further configured to acquire the residual time information of the second read request from the memory control unit.

4. The storage device of claim 3, wherein the first function and the second function are identified as a plurality of host devices logically sorted by the storage device.

5. The storage device of claim 3, wherein the performance requirement information is initialized when the storage device is booted.

6. The storage device of claim 3, wherein the performance requirement information of the first function and the performance requirement information of the second function have different values.

7. The storage device of claim 3, wherein the residual time information of the second read request includes information on a residual performance time of the read operation according to the first read request and a performance time of the read operation of the second read request.

8. The storage device of claim 3, wherein the scheduler is further configured to receive the second read request from the second function when a defense algorithm operation on the first read request is being performed as the read operation according to the first read request fails.

9. The storage device of claim 8, wherein the residual time information of the second read request includes information on a residual performance time of the defense algorithm operation on the first read request and a performance time of the read operation according to the second read request.

10. The storage device of claim 8, wherein the residual time information of the second read request includes information on a residual performance time of the defense algorithm operation on the first read request, a performance time of the read operation according to the second read request, and a performance time of a defense algorithm operation on the second read request.

11. A method of operating a memory controller for controlling a memory device including a plurality of memory dies, the method comprising:
   receiving a first read request from a first function;
   controlling at least one memory die among the plurality of memory dies to perform a read operation according to the first read request;
   receiving a second read request from a second function before the read operation according to the first read request is completed;

controlling the at least one memory die to suspend the read operation according to the first read request, based on a result obtained by comparing performance requirement information of the second function with residual time information of the second read request, which is determined according to a performance degree of the read operation according to the first read request; and controlling the at least one memory die to perform a read operation according to the second read request.

12. The method of claim 11, wherein the residual time information of the second read request includes information on a residual performance time of the read operation according to the first read request and a performance time of the read operation of the second read request.

13. The method of claim 11, wherein the receiving of the second read request for the at least one memory die includes receiving the second read request from the second function when a defense algorithm operation on the first read request is being performed as the read operation according to the first read request fails.

14. The method of claim 13, wherein the residual time information of the second read request includes information on a residual performance time of the defense algorithm operation on the first read request and a performance time of the read operation according to the second read request.

15. The method of claim 13, wherein the residual time information of the second read request includes information on a residual performance time of the defense algorithm operation on the first read request, a performance time of the read operation according to the second read request, and a performance time of a defense algorithm operation on the second read request.

16. A memory controller comprising:

a performance requirement information storage configured to store performance requirement information of each of a plurality of functions;

a scheduler configured to receive a first read request from a first function among the plurality of functions; and a memory control unit configured to control at least one memory die of a memory device to perform a read operation according to the first read request, wherein the scheduler is further configured to control, when a second read request is received from a second function among the plurality of functions before the read operation according to the first read request is completed, the at least one memory die to suspend the read operation according to the first read request and to perform a read operation according to the second read request, based on a result obtained by comparing the performance requirement information of the second function with residual time information of the second read request, which is determined according to a performance degree of the read operation according to the first read request.

17. The memory controller of claim 16, wherein the scheduler is further configured to acquire the performance requirement information of the second function from the performance requirement information storage.

18. The memory controller of claim 17, wherein performance requirement information of the first function and the performance requirement information of the second function have different values.

19. The memory controller of claim 17, wherein the residual time information of the second read request includes a residual performance time of the read operation according to the first read request and a performance time of the read operation according to the second read request.

20. The memory controller of claim 17, wherein the performance requirement information is initialized when a storage device including the memory controller is booted.

* * * * *